United States Patent [19]

Skavnak et al.

[11] Patent Number: 5,279,475
[45] Date of Patent: Jan. 18, 1994

[54] MOTORIZED TWO-PIECE VIDEOCASSETTE ADAPTOR

[75] Inventors: James E. Skavnak, Minneapolis; Thomas A. Turgeon, Fridley, both of Minn.

[73] Assignee: Minnesota Mining and Manufacturing Company, St. Paul, Minn.

[21] Appl. No.: 811,003

[22] Filed: Dec. 20, 1991

[51] Int. Cl.⁵ ............................................. G11B 15/66
[52] U.S. Cl. .................................................... 242/199
[58] Field of Search ............... 242/195, 197, 198, 199, 242/200; 360/85, 94, 132

[56] References Cited

U.S. PATENT DOCUMENTS

| | | | |
|---|---|---|---|
| 3,677,494 | 7/1972 | Protas | 242/194 |
| 4,477,851 | 10/1984 | Dalziel et al. | 242/195 X |
| 4,536,810 | 8/1985 | Umeda | 242/199 X |
| 4,595,962 | 6/1986 | d'Arc | 360/94 |
| 4,920,436 | 4/1990 | Novak | 242/199 X |
| 4,964,003 | 10/1990 | Novak | 242/199 X |
| 5,002,237 | 3/1991 | Hirayama | 242/79.1 |
| 5,021,903 | 6/1991 | Novak | 360/132 X |
| 5,031,065 | 7/1991 | Flor et al. | 360/132 |
| 5,082,196 | 1/1992 | Turgeon | 242/199 |

FOREIGN PATENT DOCUMENTS

| | | |
|---|---|---|
| 0414543 | 2/1991 | European Pat. Off. |
| 0443265 | 8/1991 | European Pat. Off. |
| 2162150A | 1/1986 | United Kingdom |
| 2217684 | 11/1989 | United Kingdom |

*Primary Examiner*—Daniel P. Stodola
*Assistant Examiner*—John P. Darling
*Attorney, Agent, or Firm*—Merchant, Gould, Smith, Edell, Welter & Schmidt

[57] ABSTRACT

A cartridge adaptor for converting a cartridge for use in a conventional video cassette machine. The adaptor has a motor to move tape connection structures onto the take-up reel prior to use in the videotape machine. The motor and associated mechanisms also return the tape to the cartridge at the conclusion of use.

17 Claims, 5 Drawing Sheets

MOTORIZED TWO-PIECE VIDEOCASSETTE ADAPTOR

BACKGROUND OF THE INVENTION

1. Field of the Invention

The present invention relates to a two-piece videocassette. One piece of the combination is a videotape cartridge. This cartridge is used with a second piece, called the videocassette adaptor. In devices of this type, the cartridge is inserted into the videocassette adaptor, and the composite two-piece assembly emulates an industry standard VHS videocassette.

2. Description of the Prior Art

It is common to supply magnetic recording media or tape in a cassette format. The traditional cassette format includes both a supply reel and a take-up reel in a single housing. The magnetic recording tape is anchored at one end to the tape supply reel, and at the other end to the tape take-up reel. The videotape machine moves the tape between these two reels. Although this system is robust and reliable in operation, the inclusion of an empty reel in the housing makes this packaging strategy inefficient for tape storage.

In applications where the size of the standard cassette is too large for inclusion into the product, several manufacturers have adopted miniature cassette formats. These miniature formats reduce the amount of tape available for use, but satisfy the other design parameters of the application. The availability of miniature cassettes has caused the development of specialized cassette-to-cassette adaptors which permit the miniature cassette to be played in a conventional videotape machine. Such devices are widely known and illustrated in the patent literature. For example, U.S. Pat. No. 4,544,970 to H. Ogata, teaches a cassette-to-cassette adaptor.

It has also been proposed to supply tape in a cartridge format for a variety of tape applications, and reference may be had to U.S. Pat. No. 4,826,101 to J. A. Smith, which teaches a computer-type magnetic tape cartridge.

More recently, the cartridge format has been proposed for videotape products as known from U.K. Patent Application No. 2,217,684 A to R. L. Davis as inventor, and U.S. Pat. No. 4,920,436 to Novak. Novak and Davis teach, inter alia, a carrier or adaptor which is used to adapt a videotape cartridge to an industry standard videocassette format. In Novak, the cartridge-to-cassette adaptor includes both a take-up reel and tether within the adaptor housing. The tape cartridge, includes a tape supply reel, and specialized interconnection hardware to connect the cartridge tape to the adaptor tether. However, in Novak, there is no mechanical drive mechanism provided for transporting the tether, and this passive cartridge adaptor structure is apparently intended for immediate use in a videotape machine, once the cartridge is loaded into the adaptor.

SUMMARY OF THE INVENTION

The present invention is directed to a motorized gear train which is incorporated within the adaptor for preparing the adaptor and cartridge combination for use in a conventional videotape machine.

The user inserts the cartridge into the adaptor and actuates a switch to initiate an internal winding cycle. At the conclusion of play, the user again actuates the switch on the ejected adaptor, to initiate an internal rewind cycle. Power for the wind and rewind cycles is supplied by a motor assembly which includes a battery, a user activated switch, a pair of limit switches, a motor and a companion gear train assembly.

The purpose of the internal wind cycle is to move the tether and the so-called "interconnection" hardware onto the take-up reel in the take-up side of the adaptor prior to placing the adaptor in to the videotape machine. Consequently, this internal winding process places magnetic recording tape under the tape access door. Therefore, when the videotape machine opens the tape access door, only magnetic tape is presented to the videotape machine transport mechanisms. This prevents contact between the "heads" of the videotape machine and the interconnection hardware.

The purpose of the complimentary internal rewind process is to return the magnetic tape media to the cartridge and to reposition the interconnection hardware This permits the removal of the cartridge from the adaptor.

Both the internal wind and internal rewind cycles are initiated by the user and they are terminated automatically.

Each of these cycles are performed by structures internal to the adaptor and referred to as "internal" to distinguish them from the wind and rewind cycles of the conventional videotape machine.

BRIEF DESCRIPTION OF THE DRAWINGS

Throughout the figures, identical reference numerals refer to identical structural elements, wherein.

DESCRIPTION OF THE PREFERRED EMBODIMENT

Internal Wind Cycle

As discussed in the Summary, the purpose the internal wind cycle is to prepare the cartridge/adaptor combination for insertion into a standard videotape machine.

Figure 1:
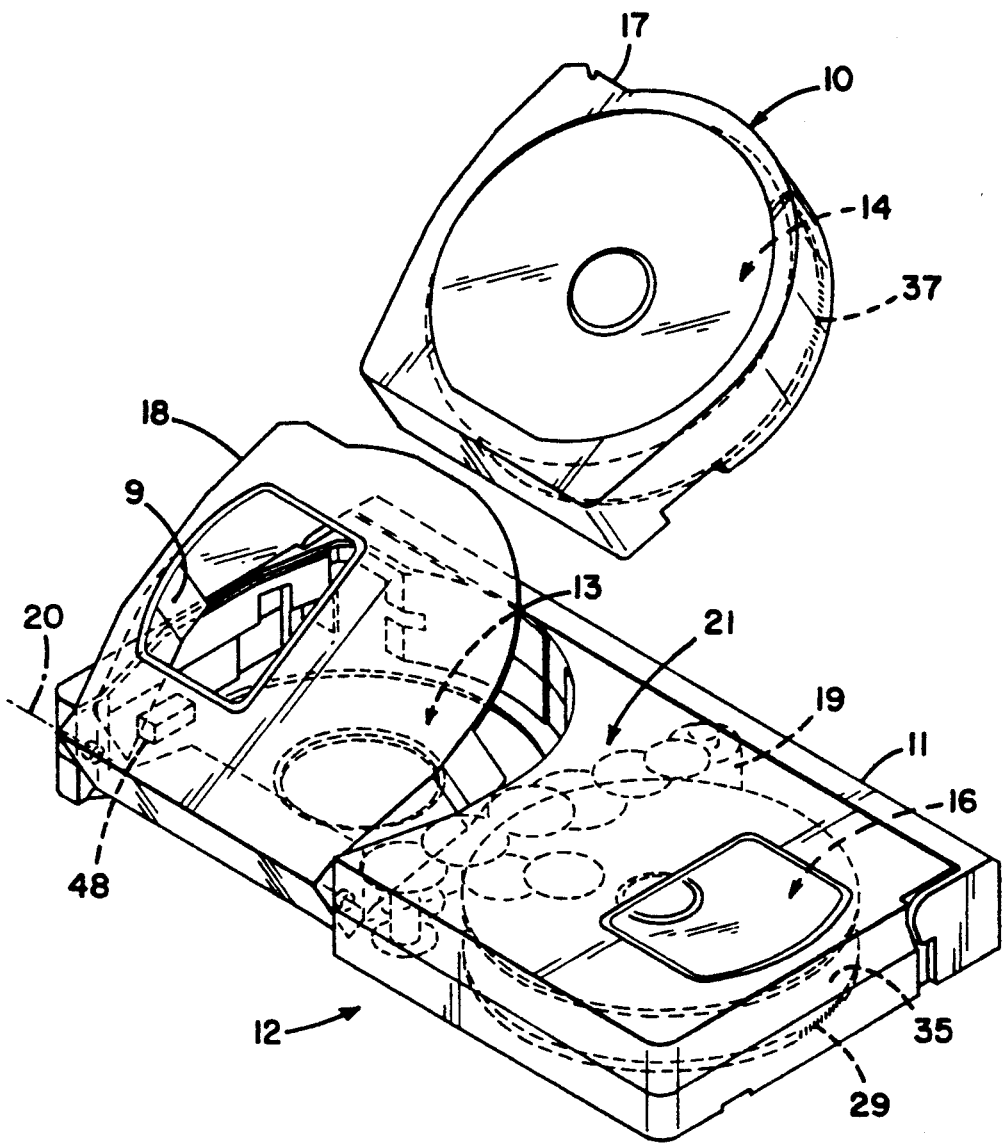
FIG.1 is a perspective view of the adaptor and cartridge.
Figure 6:
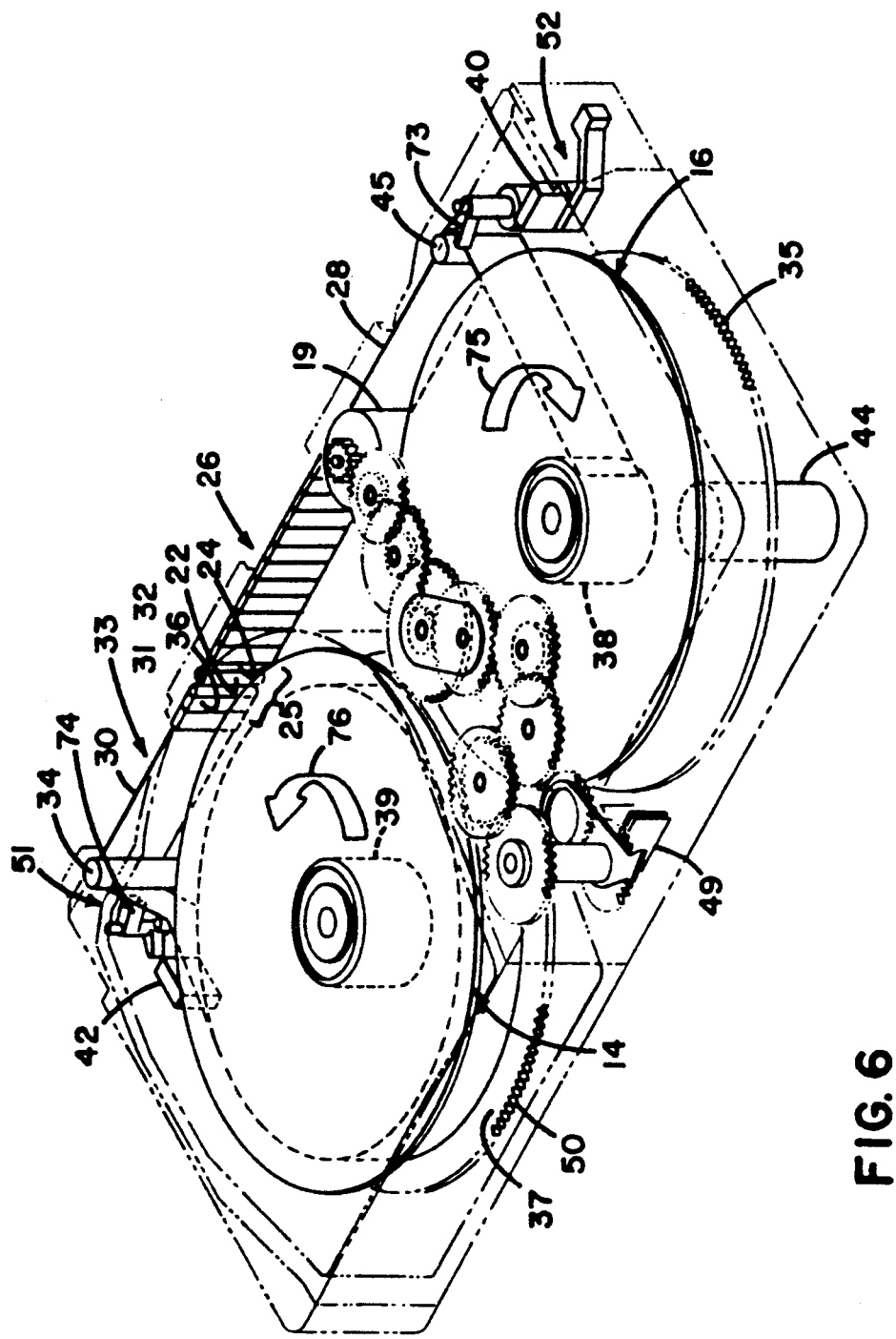
FIG.6 is a perspective phantom view showing the gear train in position, and also showing additional structures.

Turning to FIG.1, this process begins with the insertion of the cartridge 10 into the door pocket 9 of the cartridge door 18 located in the adaptor 12. With the cartridge 10 firmly seated in the cartridge door 18, the user next rotates the cartridge door 18 into the closed position, by rotating the cartridge door 18 about cartridge door hinge axis 20. This moves the cartridge 10 into the cartridge reception cavity 13 of the adaptor 12. Next, the user operates the user switch 49, which is shown in FIG.6, to initiate the internal winding process.

Mechanically, the door closure process connects the tape connector 22 with a tether connector 24. This coupling is called the interconnection and is designated 25. It is best seen in along with the tether 28 and associated structures. Note that the tether 28 is anchored to the hub 38 of the take-up reel 6. Therefore rotation of this reel 16 in the clockwise direction indicted by arrow 75 will cause the tether 28, and related structures to wrap onto the take-up hub 38. During the internal wind cycle the tether 28 pulls on the interconnection 25 and as a consequence, the tape leader 30 is withdrawn from the from the cartridge 10.

Power to rotate the reel 16 is supplied to the flange 35 of the take-up reel 16 by the motor 19 and the associated gear train assembly 21. In operation, the gear train assembly 21 is engaged with the gear-form teeth 29 formed on the flange 35. As the tether 28 and related structures are wound onto the take-up reel hub 38, the tape leader 30 is transported across the tape path 33 toward the take-up reel 16. As the interconnection 25 is wound past the guide post 45, a small pin 32 carried by the interconnection 25 intercepts the forked arm 73. Continued motion past the forked arm causes the forked arm 73 to rotate, toggling a door interlock structure 52. The door interlock is described in more detail in U.S. Pat. No. 5,082,196 and incorporated herein by reference. Briefly however, rotation of the forked arm 73 releases the tape access door 11 seen in FIG. 1 so that it may be opened by the videotape machine. It is preferred that the door interlock 52 incorporate an overcenter toggle and that the interlock arm activate the limit switch 40 seen in FIG. 6. Electrical actuation of limit switch 40 removes power from the motor 19 ending the internal wind cycle.

Internal Rewind Cycle

As previously discussed, the purpose of the internal rewind cycle is to prepare the cartridge/adaptor combination for removal of the cartridge from the adaptor.

The internal rewind cycle begins with the ejection of the cartridge/adaptor combination from the videotape machine at the conclusion of play. At this point the tether 28 is wound onto the take-up reel and the interconnection 25 is on the take-up side of the adaptor 12. With the cartridge/adaptor in hand, the user activates switch 49 to initiate the rewind cycle. This switch supplies power to the motor 19 which operates the gear train assembly 21 to transfer power to the flange 37 of the supply reel 14. This flange 37 has gear-form teeth 50 formed on the periphery of the flange 37. The motor 19 and gear train assembly 21 drive the gear-form teeth 50 and cause the flange 37 to rotate in the counterclockwise 76 direction. In this instance, the tape leader 30 places the tether 28 and associated structures in tension and the tape leader 30 is withdrawn into the cartridge housing 17. As the pin 32 approaches the supply side of the adaptor the pin 32 intercepts the forked arm 74. Continued motion past the forked arm 74 returns the tape connector 22 to a home position in the cartridge 10. The forked arm 74 is part of a cartridge interlock structure 51 more fully described in U.S. Pat. No. 5,031,065 and incorporated herein by reference. Briefly however, this cartridge interlock 51 prevents removal of the cartridge from the adaptor until the tape connector 22 is reseated within the cartridge housing 17, and the tether connector 24 is reseated in a home position proximate the cartridge reception cavity 13. Preferably this forked arm 74 operates as an overcenter toggle and activates a limit switch 42 which removes power from the motor 19 defining the end of the internal rewind cycle. At this point the cartridge 10 may be removed from the adaptor 12 as depicted in FIG. 1.

Gear Train Operation

This overview of operation permits discussion of the motorized winding structures in greater detail.

Figure 2:
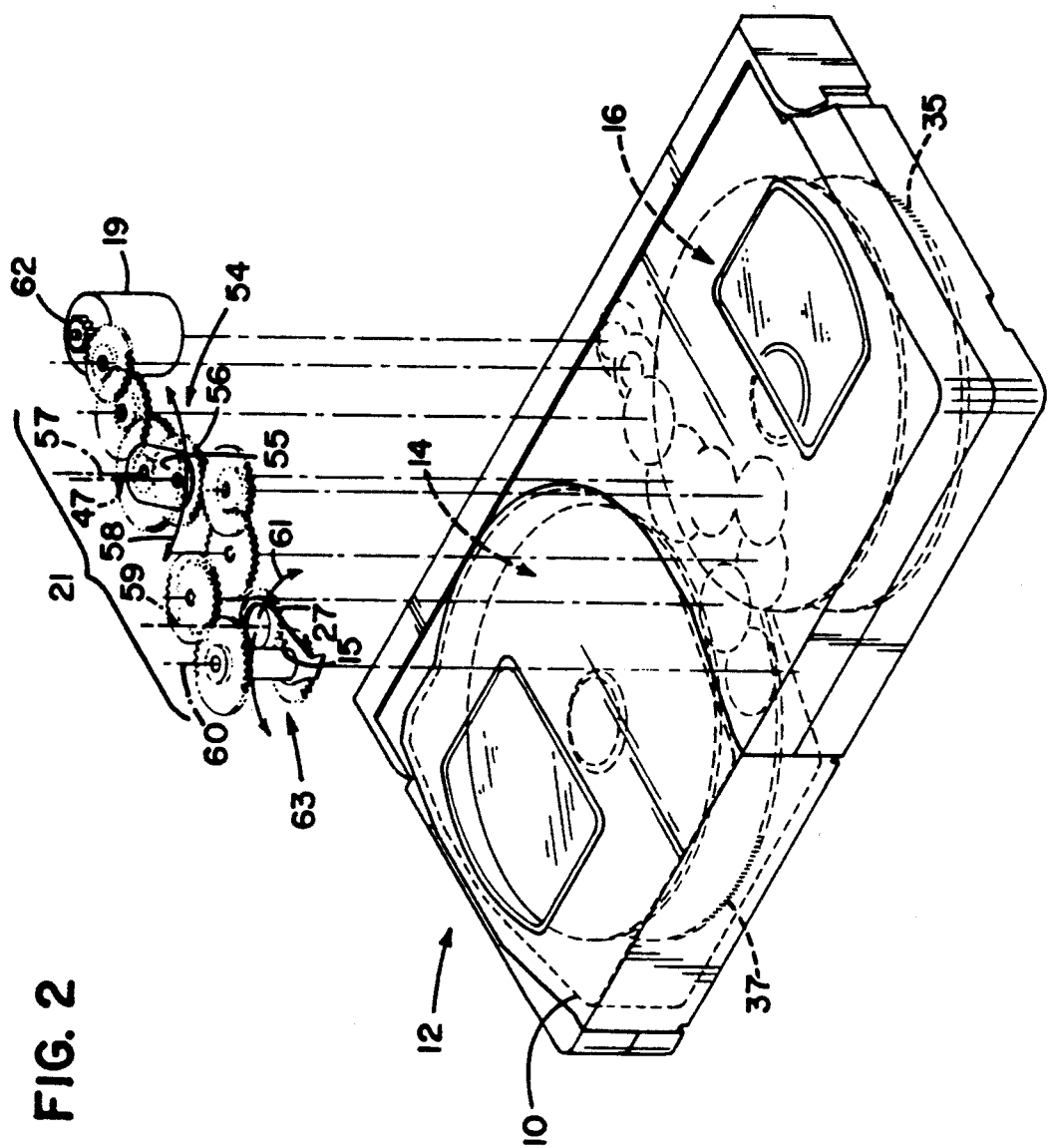
FIG.2 is an exploded perspective view showing the gear train outside of the cartridge adaptor.

Turning to FIG. 2 the cartridge 10 is shown inserted into the adaptor 12. The drawing also depicts the location for the gear train assembly 21 and the motor 19 in phantom view within the adaptor 12. These same structures (21 and 19) are shown in exploded view outside of the adaptor 12 as well.

This gear train assembly 21 provides gear reduction to provide sufficient driving torque to drive the reels. It is preferred to have differing gear ratios for the internal wind and internal rewind cycles, to equalize the current draw of the system during the wind and rewind cycles. The exact ratios depend on the drag associated with the wind and rewind operations and should be selected empirically.

The gear train assembly 21 includes two switch gear subassemblies. One is a direction reversing subassembly 54 which alters the direction of rotation of the gear train assembly, and changes the overall gear reduction ratio. The other is a clapper gear subassembly 63 to engage the gear train assembly 21 to one of the two gear flanges 37 or 35.

The direction reversing subassembly 54 includes a transfer gear 55 which is mounted on an arm 56 and is journaled to rotate about as axis 47. The arm itself is pivoted about an axis 57 which permits the gear 55 to move in an arc 58 to alter the gear train configuration.

The clapper gear subassembly 63 includes a clapper gear 27 which is mounted on an arm 15 and is journaled to rotate about as axis 59. The arm itself is pivoted about an axis 60 which permits the clapper gear 27 to move in an arc 61 which permits the clapper gear to engage either take-up reel gear flange 35 or supply reel gear flange 37.

Motion of the subassemblies along arcs 58 and 61 depend on the direction of rotation of the motor pinion 62. Parasitic drag and other gear forces cause the arms 15 and 56 to move in an arcuate path in the same rotational sense as the gear which drives the clapper gear 27 or the transfer gear 55. Thus, depending upon which way the motor pinion 62 is rotating, the power from the motor 19 is transferred to either the supply reel gear flange 37 or the take-up reel gear flange 35. Also the overall gear ratio of the gear train is selected depending on the state of the switch 49. In this fashion it is the direction of rotation of the motor 19 which causes the switch gear subassemblies 54 and 63 to change position.

Figure 3:
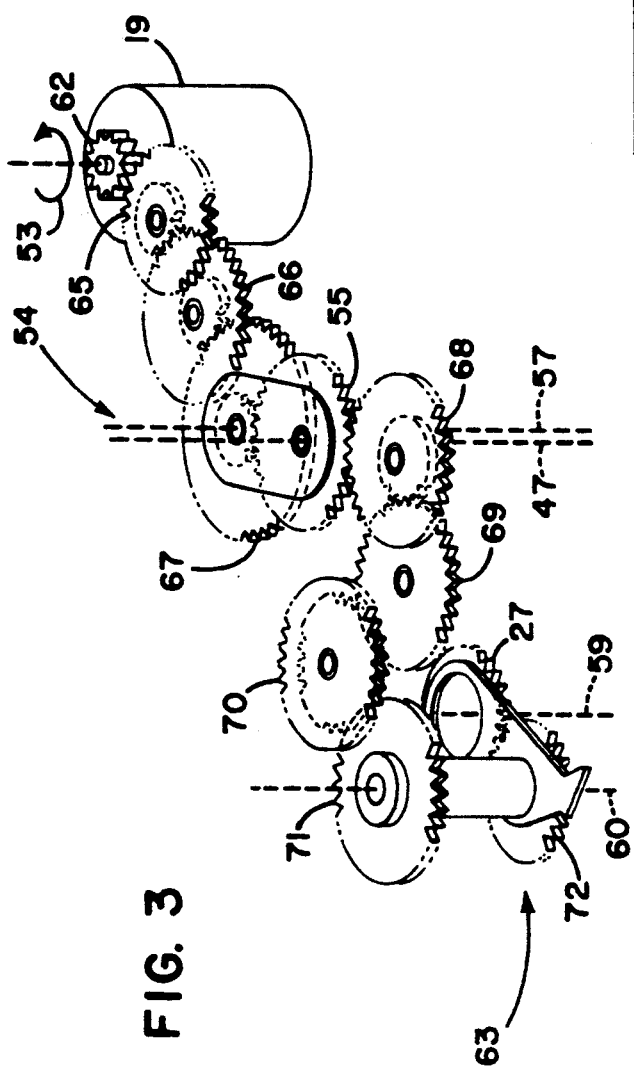
FIG.3 is a perspective view of the gear train in isolation.

FIG. 3 shows the gear train assembly 21 and the switch gear subassemblies 54 and 63 in isolation, and in greater detail. In the drawing the motor pinion 62 is rotating in a counter clockwise (CCW) direction 53. Power from the pinion 62 is transferred through gears 65,66,67,55,68,69,70,71,72 and 27 to be supplied to supply reel gear flange 37 illustrating power delivery during the internal rewind cycle. Alteration of the direction of rotation of the motor pinion 62 moves transfer gear 55 into direct contact with gear 70 reversing the rotational sense of the clapper gear 27 and moving it into contact and engagement with the take-up reel gear flange 35.

Figure 5:
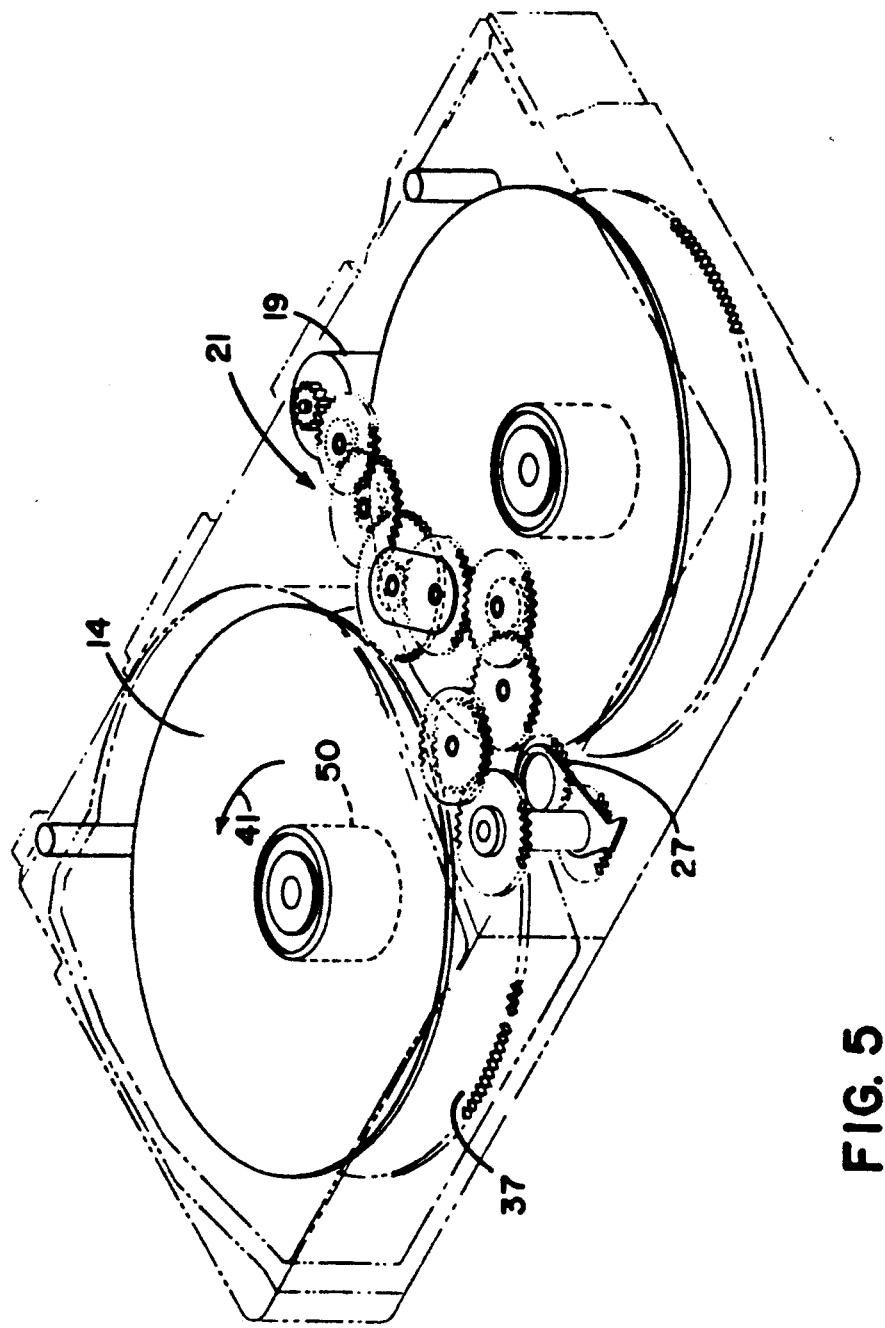
FIG.5 is a perspective phantom view showing the gear train in position.

In FIG. 5 the gear train assembly 21 is shown in phantom position in the adaptor 12. In the sense of the drawing the adaptor is configured for an internal rewinding cycle. The motor 19 is rotating in the CCW direction 53 and the clapper gear 27 is engaged with the supply reel gear flange 37. In this position the motor 19 can drive the supply reel counter clockwise direction drawing the tape toward the hub 39 of the supply reel 14. Details of a related manually driven clapper gear assembly are taught in companion U.S. Pat. No. 5,034,847 which is incorporated by reference herein.

Electrical System

Figure 4:
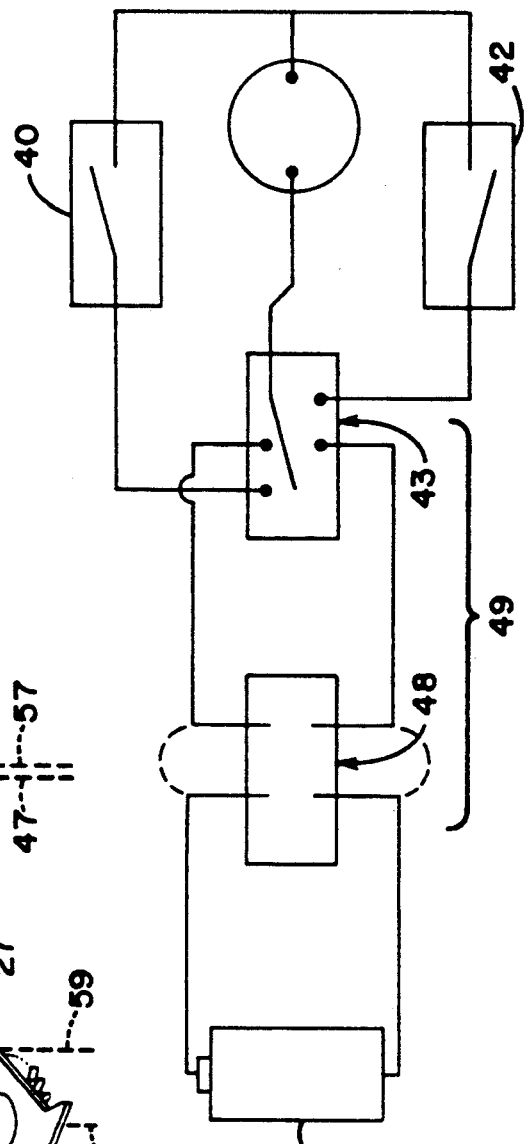
FIG.4 is an electrical schematic showing the interconnection between the switches and the motor.

FIG. 4 shows the preferred electrical connections between the internal battery 44, motor 19 and the user activated switch 49. It is preferred to combine the power switch 48 and the direction switch 43 together and present a single switch assembly 49 to the user. This switch 49 selects either the wind or rewind cycles depending upon the battery polarity supplied to the motor 19 from the switch assembly 49. This switch 49 assembly provides a means for initiating the internal wind and internal rewind cycles. As an alternate embodiment, the power switch 48 may be located proximate the cartridge door hinge axis where it may be activated by door closure. In this instance the power switch 48 acts as an interlock to insure that the cartridge is properly seated in the cartridge reception cavity 13 prior to motor 19 activation. As an alternate embodiment the power switch may be deleted altogether and the limit switches alone may be used to control the application of power to the direction switch a 43 which is presented to the user. As an alternate embodiment the initiation of the wind cycle can be accomplished by detecting cartridge 10 insertion into the cartridge reception cavity 13 for automatic initiation of the internal wind cycle. In a similar fashion the removal of the cartridge/adaptor combination from the videotape machine can automatically initiate the internal rewind cycle.

However, the preferred means for terminating these two internal cycles are preferably provided in the form of limit switches which are activated by the relative position of the tape within the adaptor housing. Switches 40 and 42 are preferably electro-mechanical limit switches, actuated by the interconnection 25. In general, switch 42 located proximate the supply reel as shown in FIG. 6, and it turns off the motor 19 when the tether 28 has been seated in a home position, and the tape leader 30 has been fully rewound into the cartridge 10. In a similar fashion, switch 40, located proximate the take-up reel 16 as shown in FIG. 6, turns off power when the interconnection 25 is wound past the forked arm 73 toward the take-up reel 16.

In this fashion, limit switch 42 turns off the motor 19 when the external rewind cycle is completed while the limit switch 40 stops the motor at the end of the internal wind cycle. It is preferred to locate a small pin 32 on the interconnection structure to actuate these limit switches, although other interconnection 25 borne features can be readily substituted within the scope of this invention.

Although the preferred mechanical/electrical switches are shown it should be understood that the other types of switches can be readily substituted, without departing from the scope of the invention. Alternatives specifically include optical switches. The preferred battery location is skewed across a front corner of the adaptor as shown in phantom outline in FIG. 6. It is contemplated that a multi-cell lithium based battery be used although a rechargeable battery may be used as well. In a similar fashion an external source of power may be used as well.

Other Hardware Structures

Turning to FIG. 6 the tape leader 30 is shown extending from a supply reel hub 39, around a guide post 34, and along the tape path 33 where it connects to a tape link 31. The tape link 31 connects to a connector link 36 which is connected in turn to a tape connector 22. This tape connector 22 has a protruding pin 32 which is discussed later. In a similar fashion a tether 28 is attached to the take-up reel hub 38 and extends around a guide post 45 and along the tape path 33. The tether 28 is connected to a collection of articulated links called the tether band 26. The final link of the tether band 26 is coupled to a tether connector 24. Reference may be had to U.S. Pat. No. 5,207,395 and incorporated herein by reference, which describes the tether and interconnection structures in greater detail.

Thus, in summary, the purpose of the motorized two piece videocassette adaptor is to transport interconnection hardware between the supply reel side of the adaptor and the take-up reel side of the adaptor. The purpose of the interconnection 25 hardware is to connect the tape to the tether and the purpose of the tether and associate structures is to draw the tape from the supply reel 14, and to place the tape leader 30 under the tape access door 11 of the adaptor 12.

At the conclusion of play, the videotape machine ejects the adaptor 12 and returns it to the user who, once again, activates the user switch 49, and the same motor 19 and gear train assembly 21 drives the gear tooth flange 37 of the supply reel 14 moving the tape leader 30 toward the supply reel 14. When the tape leader 30 is restored to the cartridge 10, and the tether band is returned to the supply side of the adaptor, the cartridge door 18 may be opened and the cartridge 10 removed ending the cycle of use.

We claim:

1. A motorized adaptor for use with a cartridge of the type having a single supply reel, said single supply reel adapted to store tape, and having a length of tape wound thereon, said supply reel having a flange, said flange having a plurality of gear-form teeth on the periphery of said flange forming a supply reel gear flange, said adaptor comprising:

an adaptor housing having a cartridge reception cavity, said cartridge reception cavity adapted to receive said cartridge;

a take-up reel located within said adaptor housing laterally adjacent said cartridge reception cavity, said take-up reel having a flange, said flange having a plurality of gear-form teeth located around the periphery of said flange forming a take-up reel gear flange;

gear train means for driving said supply reel gear flange and for driving said take-up reel gear flange;

motor means located within said adaptor housing coupled to said gear train means for supplying rotational motion to said gear train means;

power means coupled to said motor means for supplying power to said motor means;

initiation means located within said adaptor housing coupled to said motor means for starting an internal wind cycle and for starting an internal rewind cycle;

termination means located within said adaptor housing coupled to said motor means for stopping said internal wind cycle and for stopping said internal rewind cycle;

whereby said tape is moved from said supply reel toward said take-up reel during said internal wind cycle and said tape is moved from said take-up reel toward said supply reel during said internal rewind cycle.

2. The motorized adaptor of claim 1 wherein said gear train means includes:
   direction reversing subassembly means for altering the direction of rotation of at least a portion of said gear trains means in response to the direction of rotation of said motor means.

3. The motorized adaptor of claim 2 wherein said direction reversing subassembly means comprises:
   a transfer gear arm, adapted for movement through an arc, centered about a first pivot axis, from a first position to a second position;
   a transfer gear located on said transfer gear arm mounted for rotation about a first rotation axis;
   whereby said transfer gear arm moves from said first position to said second position in response to the direction of rotation of said motor means, said first position corresponding to a first gear ratio, and said second position corresponding to a second gear ratio different from said first gear ratio.

4. The motorized adaptor of claim 2 wherein said direction reversing subassembly means comprises:
   a transfer gear arm, adapted for movement through an arc, centered about a first pivot axis, from a first position to a second position;
   a transfer gear located on said transfer gear arm mounted for rotation about a first rotation axis;
   whereby said transfer gear arm moves from said first position to said second position in response to the direction of rotation of said motor means, said first position corresponding to a first gear rotation direction, and said second position corresponding to a second gear rotation direction different from said first gear rotation direction.

5. The motorized adaptor of claim 1 wherein said gear train means includes:
   clapper gear subassembly means for engaging said gear train means with either said take-up reel gear flange or said supply reel gear flange in response to the direction of rotation of said motor means.

6. The motorized adaptor of claim 5 wherein said clapper gear subassembly means comprises:
   a clapper gear arm, adapted for movement through an arc, centered about a second pivot axis, from a first position to a second position;
   a clapper gear located on said transfer gear arm mounted for rotation about a second rotation axis;
   whereby said clapper gear arm moves from said first position to said second position in response to the direction of rotation of said motor means, said first position corresponding to engagement with said take-up reel gear flange, and said second position corresponding to engagement with said supply reel gear flange.

7. The motorized adaptor of claim 1 wherein said motor means comprises:
   a reversible electric motor having a first polarity corresponding to a first direction of rotation, and having a second polarity corresponding to a second direction of rotation.

8. The motorized adaptor of claim 7 wherein said initiation means comprises:
   user activated switch means for selecting between said first and second polarities.

9. The motorized adaptor of claim 1 wherein said power means comprises:
   a battery located with said adaptor housing.

10. The motorized adaptor of claim 1 wherein said termination means comprises:
    a first limit switch for removing power from said motor means when said tape is proximate said take-up reel, defining the conclusion of said internal wind cycle.

11. The motorized adaptor of claim 1 wherein said termination means comprises:
    a second switch for removing power from said motor means when said tape is proximate said supply reel, defining the conclusion of said internal rewind cycle.

12. The adaptor of claim 1 wherein said termination means comprises:
    a first limit switch for removing power from said motor means when said tape is proximate said take-up reel, defining the conclusion of said internal wind cycle;
    a second switch for removing power from said motor means when said tape is proximate said supply reel, defining the conclusion of said internal rewind cycle.

13. A motorized adaptor for use with a cartridge of the type having a single supply reel, said single supply reel adapted to store tape, and having a length of tape wound thereon, said supply reel having a flange, said flange having a plurality of gear-form teeth on the periphery of said flange forming a supply reel gear flange, said adaptor comprising:
    an adaptor housing having a cartridge reception cavity, said cartridge reception cavity adapted to receive said cartridge;
    a take-up reel located within said adaptor housing laterally adjacent said cartridge reception cavity, said take-up reel having a flange, said flange having a plurality of gear-form teeth located around the periphery of said flange forming a take-up reel gear flange;
    gear train means for driving said supply reel gear flange and for driving said take-up reel gear flange;
    clapper gear subassembly means for engaging said gear train means with either said take-up reel gear flange or said supply reel gear flange in response to the direction of rotation of said motor means;
    motor means located within said adaptor housing coupled to said gear train means for supplying rotational motion to said gear train means;
    power means coupled to said motor means for supplying power to said motor means;
    initiation means located within said adaptor housing coupled to said motor means for starting an internal wind cycle and for starting an internal rewind cycle;
    termination means located within said adaptor housing coupled to said motor means for stopping said internal wind cycle and for stopping said internal rewind cycle;
    whereby said tape is moved from said supply reel toward said take-up reel during said internal wind cycle and said tape is moved from said take-up reel toward said supply reel during said internal rewind cycle.

14. A motorized adaptor for use with a cartridge of the type having a single supply reel, said single supply reel adapted to store tape, and having a length of tape wound thereon, said supply reel having a flange, said flange having a plurality of gear-form teeth on the periphery of said flange forming a supply reel gear flange, said adaptor comprising:

an adaptor housing having a cartridge reception cavity, said cartridge reception cavity adapted to receive said cartridge;

a take-up reel located within said adaptor housing laterally adjacent said cartridge reception cavity, said take-up reel having a flange, said flange having a plurality of gear-form teeth located around the periphery of said flange forming a take-up reel gear flange;

gear train means for driving said supply reel gear flange and for driving said take-up reel gear flange;

said gear train means including, direction reversing subassembly means for altering the direction of rotation of at least a portion of said gear trains means in response to the direction of rotation of said motor means;

said direction reversing subassembly means including;

a transfer gear arm, adapted for movement through an arc, centered about a first pivot axis, from a first position to a second position, a transfer gear located on said transfer gear arm mounted for rotation about a first rotation axis;

whereby said transfer gear arm moves from said first position to said second position in response to the direction of rotation of said motor means, said first position corresponding to a first gear ratio, and said second position corresponding to a second gear ratio different from said first gear ratio;

motor means located within said adaptor housing coupled to said gear train means for supplying rotational motion to said gear train means;

power means coupled to said motor means for supplying power to said motor means;

initiation means located within said adaptor housing coupled to said motor means for starting an internal wind cycle and for starting an internal rewind cycle;

termination means located within said adaptor housing coupled to said motor means for stopping said internal wind cycle and for stopping said internal rewind cycle;

whereby said tape is moved from said supply reel toward said take-up reel during said internal wind cycle and said tape is moved from said take-up reel toward said supply reel during said internal rewind cycle.

15. A motorized adaptor for use with a cartridge of the type having a single supply reel, said single supply reel adapted to store tape, and having a length of tape wound thereon, said supply reel having a flange, said flange having a plurality of gear-form teeth on the periphery of said flange forming a supply reel gear flange, said adaptor comprising:

an adaptor housing having a cartridge reception cavity, said cartridge reception cavity adapted to receive said cartridge;

a take-up reel located within said adaptor housing laterally adjacent said cartridge reception cavity, said take-up reel having a flange, said flange having a plurality of gear-form teeth located around the periphery of said flange forming a take-up reel gear flange;

gear train means for driving said supply reel gear flange and for driving said take-up reel gear flange;

said gear train means including, direction reversing subassembly means for altering the direction of rotation of at least a portion of said gear trains means in response to the direction of rotation of said motor means;

wherein said direction reversing subassembly means includes;

a transfer gear arm, adapted for movement through an arc, centered about a first pivot axis, from a first position to a second position;

a transfer gear located on said transfer gear arm mounted for rotation about a first rotation axis;

whereby said transfer gear arm moves from said first position to said second position in response to the direction of rotation of said motor means, said first position corresponding to a first gear rotation direction, and said second position corresponding to a second gear rotation direction different from said first gear rotation direction;

motor means located within said adaptor housing coupled to said gear train means for supplying rotational motion to said gear train means;

power means coupled to said motor means for supplying power to said motor means;

initiation means located within said adaptor housing coupled to said motor means for starting an internal wind cycle and for starting an internal rewind cycle;

termination means located within said adaptor housing coupled to said motor means for stopping said internal wind cycle and for stopping said internal rewind cycle;

whereby said tape is moved from said supply reel toward said take-up reel during said internal wind cycle and said tape is moved from said take-up reel toward said supply reel during said internal rewind cycle.

16. A motorized adaptor for use with a cartridge of the type having a single supply reel, said single supply reel adapted to store tape, and having a length of tape wound thereon, said supply reel having a flange, said flange having a plurality of gear-form teeth on the periphery of said flange forming a supply reel gear flange, said adaptor comprising:

an adaptor housing having a cartridge reception cavity, said cartridge reception cavity adapted to receive said cartridge;

a take-up reel located within said adaptor housing laterally adjacent said cartridge reception cavity, said take-up reel having a flange, said flange having a plurality of gear-form teeth located around the periphery of said flange forming a take-up reel gear flange;

gear train means for driving said supply reel gear flange and for driving said take-up reel gear flange;

said gear train means including, direction reversing subassembly means for altering the direction of rotation of at least a portion of said gear trains means in response to the direction of rotation of said motor means;

said gear train means including, clapper gear subassembly means for engaging said gear train means with either said take-up reel gear flange or said supply reel gear flange in response to the direction of rotation of said motor means;

wherein said clapper gear subassembly means includes, a clapper gear arm, adapted for movement through an arc, centered about a second pivot axis, from a first position to a second position;

a clapper gear located on said transfer gear arm mounted for rotation about a second rotation axis;

whereby said clapper gear arm moves from said first position to said second position in response to the direction of rotation of said motor means, said first position corresponding to engagement with said take-up reel gear flange, and said second position corresponding to engagement with said supply reel gear flange;

motor means located within said adaptor housing coupled to said gear train means for supplying rotational motion to said gear train means;

power means coupled to said motor means for supplying power to said motor means;

initiation means located within said adaptor housing coupled to said motor means for starting an internal wind cycle and for starting an internal rewind cycle;

termination means located within said adaptor housing coupled to said motor means for stopping said internal wind cycle and for stopping said internal rewind cycle;

whereby said tape is moved from said supply reel toward said take-up reel during said internal wind cycle and said tape is moved from said take-up reel toward said supply reel during said internal rewind cycle.

17. A motorized adaptor for use with a cartridge of the type having a single supply reel, said single supply reel adapted to store tape, and having a length of tape wound thereon, said supply reel having a flange, said flange having a plurality of gear-form teeth on the periphery of said flange forming a supply reel gear flange, said adaptor comprising:

an adaptor housing having a cartridge reception cavity, said cartridge reception cavity adapted to receive said cartridge;

a take-up reel located within said adaptor housing laterally adjacent said cartridge reception cavity, said take-up reel having a flange, said flange having a plurality of gear-form teeth located around the periphery of said flange forming a take-up reel gear flange;

gear train means for driving said supply reel gear flange and for driving said take-up reel gear flange;

motor means located within said adaptor housing coupled to said gear train means for supplying rotational motion to said gear train means;

power means coupled to said motor means for supplying power to said motor means;

said power means including a battery;

initiation means located within said adaptor housing coupled to said motor means for starting an internal wind cycle and for starting an internal rewind cycle;

termination means located within said adaptor housing coupled to said motor means for stopping said internal wind cycle and for stopping said internal rewind cycle;

whereby said tape is moved from said supply reel toward said take-up reel during said internal wind cycle and said tape is moved from said take-up reel toward said supply reel during said internal rewind cycle.

* * * * *

UNITED STATES PATENT AND TRADEMARK OFFICE
CERTIFICATE OF CORRECTION

PATENT NO.  : 5,279,475
DATED       : January 18, 1994
INVENTOR(S) : Janes E. Skavnak and Thomas A. Turgeon It is certified that error appears in the above-identified patent and that said Letters Patent is hereby corrected as shown below:

In column 2, line 8, after the word "adaptor", please delete "in to" and isert therefor --into--

In column 2, line 16, before the word "internal", please delete the word "complimentary" and insert therefor --complementary--

In column 2, lines 18 and 19, after the word "hard-ware", please insert a period --.--

In column 3, line 7, before the word "cartridge", please delete the words "from the"

In column 5, line 27, after the word "switch" and before "43", delete "a"

Signed and Sealed this

Nineteenth Day of July, 1994

Attest:

BRUCE LEHMAN

*Attesting Officer*      *Commissioner of Patents and Trademarks*